J. C. KITTON.
CONDENSER.
APPLICATION FILED SEPT. 11, 1916.
1,251,894.
Patented Jan. 1, 1918.
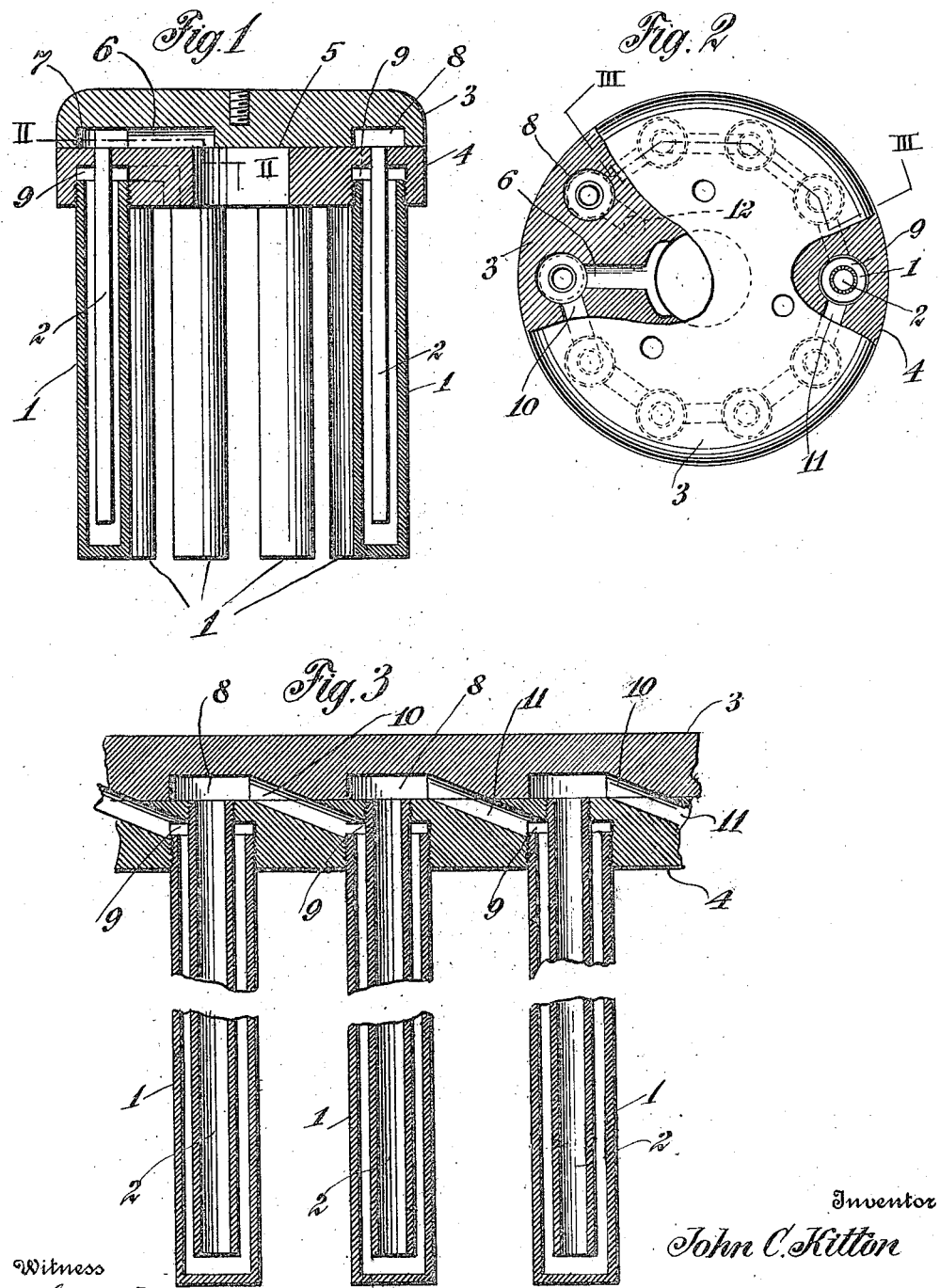
Witness
Charles Kole
Karl N. Butler
Inventor
John C. Kitton
By
Attorneys

UNITED STATES PATENT OFFICE.

JOHN C. KITTON, OF CHICAGO, ILLINOIS.

CONDENSER.

1,251,894.

Specification of Letters Patent.

Patented Jan. 1, 1918.

Application filed September 11, 1916. Serial No. 119,344.

*To all whom it may concern:*

Be it known that I, JOHN C. KITTON, a citizen of the United States of America, residing at Chicago, in the county of Cook and State of Illinois, have invented certain new and useful Improvements in Condensers, of which the following is a specification, reference being had therein to the accompanying drawings.

To provide a simple, durable and compact condenser that may be advantageously used in connection with the compressor of my refrigeratory apparatus, disclosed by a companion application, filed Sept. 11th, 1916, Serial No. 119,342, may be considered the principal object of my invention. The condenser is somewhat along the lines of a heat absorbing device disclosed by another companion application, filed Sept. 11, 1916, Serial No. 119,345, insomuch, that I utilize inner and outer conduits to provide a sinuous or tortuous passage for gas to be condensed. In order that these inner and outer conduits will occupy a comparatively small space relative to a compressor and other parts of a refrigeratory apparatus, the conduits are suspended from a circular condenser or distributing head and the circumferential arrangement of the conduits permits of the condenser surrounding the compressor heretofore referred to. Other features of my invention will hereinafter appear, and reference will now be had to the drawing, wherein—

Figure 1 is a vertical sectional view of the condenser;

Fig. 2 a plan of the same, partly broken away and partly in section on the line II—II of Fig. 1, and Fig. 3 is an enlarged vertical sectional view on the lines III—III of Fig. 2.

The condenser comprises outer conduits 1, inner conduits 2, and a distributing head composed of sections 3 and 4, the section 4 supporting the inner and outer conduits. The section 3 is suitably mounted upon the section 4 and centrally of the section 4 is an inlet opening 5 communicating with a radially disposed passage 6 in the lower face of the section 3, said passage terminating in a recess 7 adjacent the marginal edges of the section 3. The lower face of the section 3 has other recesses 8 circumferentially disposed adjacent the marginal edges of said section, and all of these recesses are adapted to communicate with the inner conduits 2, said conduits being circumferentially disposed about the section 4 with the upper open ends thereof flush with the upper face of said section.

The section 4 has the lower face thereof provided with sockets 9 through which the inner conduits 2 extend and these sockets have the walls thereof screwthreaded to receive the upper exteriorly screwthreaded ends of the outer conduits 1. The outer conduits 1 have the outer ends thereof closed and in proximity to the lower open ends of the inner conduits 2 and said outer conduits inclose the inner conduits and coöperate therewith in providing extensive passages for gas.

The section 3 has the lower face thereof, at each of the recesses 7 and 8, provided with angularly disposed ports 10 communicating with similar ports 11 in the section 4, and by reference to Fig. 3 it will be noted that the ports 11 communicate with the sockets 9, thereby placing the upper ends of the inner conduits 2 in communication with the upper ends of the outer conduits 1.

One of the recesses 8 has a suitable outlet port 12.

From the foregoing it will be observed that gas entering the opening 5 and the passage 6 passes into one of the inner conduits 2, and after traveling downwardly in this conduit, the gas ascends in the outer conduit 1 to pass through the ports 11 and 10 into a recess 8. From the recess 8 the gas descends in an inner conduit 2 and ascends in an outer conduit 1 to continue on around the distributing head and through the inner and outer conduits thereof to be condensed or converted into a liquid before reaching the outlet port 12.

Considerable importance is attached to the fact that the inner and outer conduits can be easily and quickly assembled relative to the section 4 and by removing the section 3 all of the passages and ports of the distributing head may be thoroughly cleansed. Importance is also attached to the circumferential arrangement of the inner and outer conduits as a very compact condenser is provided for easy mounting on a compressor adapted for supplying gas through the opening 5 of the condenser.

With the outer walls of the outer conduit 1 subjected to the action of a cooling agent, any gas circulated in the conduit will be quickly liquefied, as the gas is conducted in films between the conduits 1 and 2 and is constantly brought into contact with the cold walls of the outer conduits 1.

While the condenser has been herein referred to as being especially designed for refrigeratory apparatus or system, it is to be understood that the condenser may be used for distilling, cooling or other purposes.

What I claim is:—

A device of the type described, comprising superposed distributing disk-like head sections, the lower head section having a central inlet opening, inner and outer conduits carried by the lower section with the outer conduits inclosing the inner conduits and having lower communicating ends, said conduits being disposed circumferentially of the axis of said distributing head sections so that a compressor may be placed within said device and connected to the central inlet openings of the distributing heads, the upper section having recesses in communication with the upper ends of the inner conduits, and both sections having ports establishing communication between the upper ends of the outer conduits and the recesses of the upper section.

In testimony whereof I affix my signature in presence of two witnesses.

JOHN C. KITTON.

Witnesses:
 ANNA M. DORR,
 KARL H. BUTLER.

Copies of this patent may be obtained for five cents each, by addressing the "Commissioner of Patents, Washington, D. C."